United States Patent [19]

Smith

[11] Patent Number: 5,005,878
[45] Date of Patent: Apr. 9, 1991

[54] COUPLER ELEMENT

[75] Inventor: Loren Smith, Livonia, Mich.

[73] Assignee: Robert Bosch GmbH, Stuttgart, Fed. Rep. of Germany

[21] Appl. No.: 452,085

[22] Filed: Dec. 18, 1989

[30] Foreign Application Priority Data

Feb. 15, 1989 [DE] Fed. Rep. of Germany ....... 3904479

[51] Int. Cl.$^5$ .......................... F16L 39/00; F16L 37/00
[52] U.S. Cl. ..................................... 285/319; 285/921
[58] Field of Search ................ 585/319, 320, 325, 921

[56] References Cited

U.S. PATENT DOCUMENTS

| 614,888 | 11/1898 | Poetz | 285/325 |
| 4,474,159 | 10/1984 | Katnik | |
| 4,786,085 | 11/1988 | Sauer et al. | 285/319 |
| 4,948,176 | 10/1990 | Bartholomew | 285/921 |

FOREIGN PATENT DOCUMENTS 3074066 10/1981 Fed. Rep. of Germany .
3498597 2/1986 Fed. Rep. of Germany .

Primary Examiner—Randolph A. Reese
Assistant Examiner—Spencer Warnick
Attorney, Agent, or Firm—Edwin E. Greigg

[57] ABSTRACT

For reasons of technologically simple, economical manufacture, a coupler element for coupling an injection nozzle (11) to a connector neck (12), coaxial with it, on an injection line is embodied as a one-piece plastic clip (10), which comprises a C-shaped annular disk (16) and spring legs (17) protruding away from the annular disk (16) in the axial direction of the clip and having inwardly oriented detent protrusions (18). With a groove engagement region, the annular disk (16) engages a circumferential groove (15) in the injection nozzle (11), while after the coaxial insertion of the end of the injection nozzle (11) into the connector neck (12), the detent protrusions (18) snap into place behind a locking collar (14) on the connector neck (12) (FIG. 1).

23 Claims, 2 Drawing Sheets

COUPLER ELEMENT

BACKGROUND OF THE INVENTION

The invention relates to a coupler element for coupling an injection nozzle to a connector neck coaxial with it on an injection line for a fuel system.

A known coupler element of this type (German Patent 34 28 597) is embodied as a U-shaped spring clamp, its crossbar extending transversely to the longitudinal extension of the injection nozzle, and its legs on the one hand, with tabs bent radially inward at the edge, engaging a circumferential groove on the injection nozzle, and on the other hand having openings into which the locking collar on the connector neck can be snapped into place for locking. For radial fixation of the spring clamp in the circumferential groove of the injection nozzle, the tabs have concavely extending circular arc shaped segments, which correspond in radius to that of the circumferential groove. In assembly, first the spring clamp is slipped onto the injection nozzle, causing the legs to snap into place in the circumferential groove. Then the injection nozzle, provided with the spring clamp, is thrust axially into the connector neck. To enable the legs to slide over the locking collar, they are bent outward in the insertion direction and are spread apart by the locking collar during the insertion. As soon as the locking collar has snapped into place in the opening, the legs snap back into their initial position.

A spring clamp of this type, stamped from sheet metal, has the advantage of very simple assembly. The spring clamp is slipped into the injection nozzle by a machine, and the preassembled unit is inserted axially into the connector neck of the injection line until the spring clamp snaps into place. In this way major axial forces can be transmitted without generating any moments of flexion.

OBJECT AND SUMMARY OF THE INVENTION

The coupler element according to the invention is simpler and less expensive to manufacture than known couplers, while still having the above-discussed advantages. The one-piece plastic clip is injected or extruded in a single production operation. The clip assures reliable coupling of the injection nozzle and injection line even under rough operating conditions.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
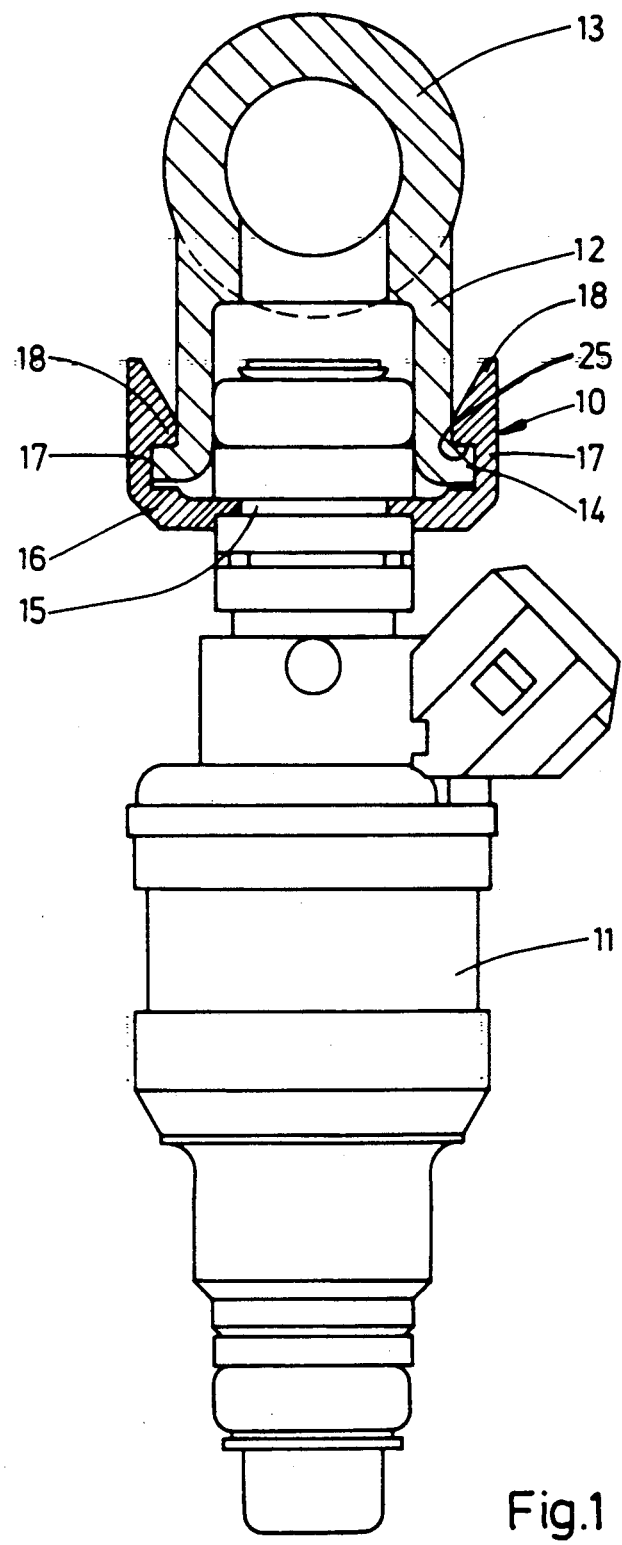
FIG. 1 is a side view of an injection nozzle and an injection line, joined together by a coupler element and shown partly in section.
Figure 2:
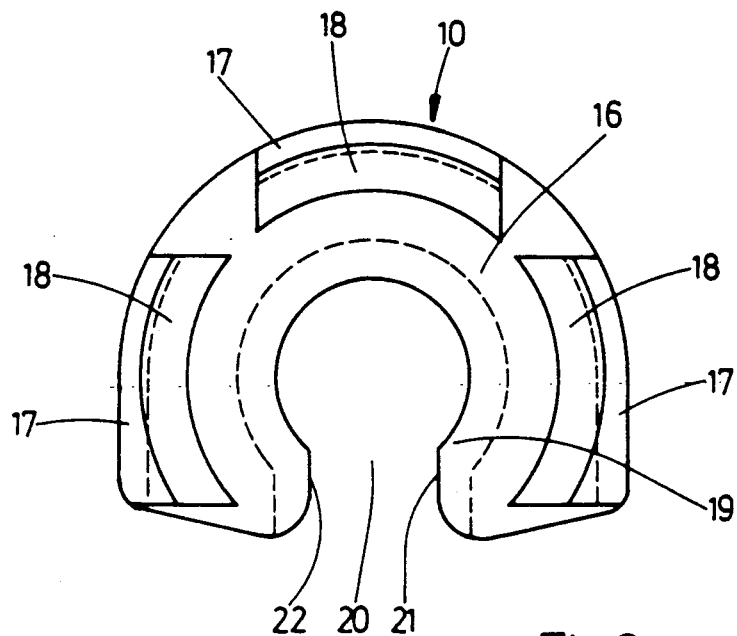
FIG. 2 is a plan view of the coupler element of FIG. 1.
Figure 3:
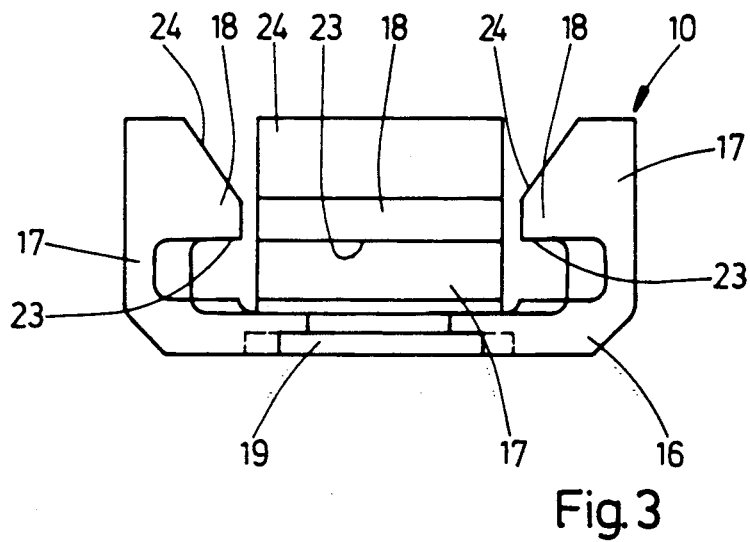
FIG. 3 is a side view of the coupler element of FIGS. 1 and 2.

The one-piece plastic clip 10 shown in plan view in FIG. 2 and in side view in FIG. 3, made of glass-fiber reinforced plastic, serves to couple the rearward end of an injection nozzle 11 to a connector neck 12 of an injection line 13 (FIG. 1) supplying the injection nozzle 11 with fuel. The connector neck 12 is formed integrally onto the injection line 13, which is generally made of plastic, and is provided on its free end with a locking collar 14 that protrudes radially at the circumference. Near its end that can be inserted into the connector neck 12, the injection nozzle 11 has a circumferential groove 15. The plastic clip 10 engages the circumferential groove 15 and snaps into place behind the locking collar 14, thereby effecting the coupling of the injection nozzle 11 and connector neck 12. As can be seen in FIGS. 2 and 3, the plastic clip 10, in detail, comprises a C-shaped annular disk 16 and three spring legs 17 protruding away from the annular disk 16 in the axial direction of the plastic clip on their facing inner sides, the spring legs 17 each have one detent protrusion 18 for reaching behind the locking collar 14. The annular disk 16, spring legs 17 and detent protrusions 18 are all in one piece with one another. The annular disk 16 has an inside diameter that corresponds to the outside diameter of the circumferential groove 15 on the injection nozzle 11, and on its underside remote from the spring legs 17, the annular disk has a coaxial recess 19, the inside diameter of which corresponds to the outside diameter of the injection nozzle 11 in the vicinity of the circumferential groove 15. The axial depth of the recess 19 is dimensioned to be equal to the difference between the thickness of the annular disk 16 and the axial width of the circumferential groove 15, so that in the vicinity of the recess 19 on the annular groove 15, a groove engagement region having a thickness corresponding to the groove width is created. With this groove engagement region, the annular disk 16 engages the circumferential groove in a somewhat form-fitting manner, with the recess 19 surrounding the outer wall of the injection nozzle 11. The C shape provides the annular disk 16 with an opening 20, the width of which is dimensioned to be smaller than the inside diameter of the annular disk 16. The opening 20 is defined by parallel end faces 21 and 22 of the annular disk 16; toward the outer circumference of the annular disk 16 these end faces recede behind the opening width and are rounded off there.

The spring legs 17 are offset from one another by the same circumferential angle; the middle one of the three spring legs 17 is diametrically opposite the opening 20 in the annular disk 16. Each detent protrusion 18 on a spring leg 17 has one undercut face 23 extending transversely to the clip axis and one lifting incline 24 extending at an acute angle to the clip axis. By means of this lifting incline 24, the detent protrusions 18 can be slipped outward over the locking collar 14, deflecting the spring legs 17.

For securing the injection nozzle 11 on the connector neck 12, the plastic clip 10 is first slipped radially onto the end of the injection nozzle 11, in such a way that the groove engagement region of the annular disk 16 embodied in the recess 19 engages the circumferential groove 15 of the injection nozzle 11. In this process the annular disk 16 is first spread apart in the vicinity of the opening 20, and then snaps into the circumferential groove 15, with the inner wall of the annular disk 16 form-fittingly encompassing the bottom of the circumferential groove 15. The plastic clip 10 is thus secured against radial displacement on the injection nozzle 11. The injection nozzle 11 provided with the plastic clip 10 is no axially inserted into the connector neck 12. In this process the detent protrusions 18 slide over the locking collar 14, in the course of which the spring legs 17 are spread apart outward. As soon as the detent protrusions 18 have slipped past the locking collar 14, the spring legs 17 snap back into their initial position; the undercut faces 23 of the detent protrusions 18 now rest on the annular face 25 of the locking collar 14 remote from the injection nozzle (FIG. 1).

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A coupler element for coupling an injection nozzle to a connector neck of a fuel supply line, coaxial with said injection nozzle, said injection nozzle includes a circumferential groove which groove is engaged by said coupler element and said connector neck includes a locking collar protruding radially beyond the circumference of the connector neck, to which said coupling element is snapped, said coupling element including a one-piece plastic clip (10) comprising a C-shaped portion having an opening (20) in annular disk (16), said annular disk has an inside diameter corresponding to an outside diameter of said circumferential groove (15) of said injection nozzle and a thickness corresponding to a width of said circumferential groove, said coupler element further comprises spring legs (17) that protrude outward from said annular disk (16) that extend in an axial direction of the clip, each of said spring legs have a detent protrusion (18) on their inner facing sides for extending above said locking collar (14) of said connector neck.

2. A coupler element as defined by claim 1, in which said annular disk (16) has a coaxial recess (19) having an inside diameter corresponding to an outside diameter of said injection nozzle (11) in the region of said circumferential groove (15), the axial depth of said annular disk being dimensioned to be equal to a difference between the disk thickness and the groove width of the circumferential groove (15).

3. A coupler element as defined by claim 2, in said C-shaped portion has a opening (20) having an opening width in the annular disk (16) which is dimensioned to be smaller than the inside diameter of the annular disk.

4. A coupler element as defined by claim 3, in which said opening (20) is defined by parallel end faces (21) of the annular disk (16), which toward the outer circumference of the annular disk (16) recede behind the opening width and are rounded off there.

5. A coupler element as defined by claim 4, which said coupler element include a total of three spring legs (17) disposed offset from one another by equal circumferential angles one of said spring legs is located diametrically opposite said opening (20) of the C-shaped annular disk (16).

6. A coupler element as defined by claim 3, which said coupler element include a total of three spring legs (17) disposed offset from one another by equal circumferential angles one of said spring legs is located diametrically opposite said opening (20) of the C-shaped annular disk (16).

7. A coupler element as defined by claim 2, which said coupler element include a total of three spring legs (17) disposed offset from one another, by equal circumferential angles one of said spring legs is located diametrically opposite said opening (20) of the C-shaped annular disk (16).

8. A coupler element as defined by claim 2, in which each detent protrusion (18) has an undercut face (23), extending transversely to a clip axis, and a lifting incline (24), extending at an acute angle to the clip axis, by means of which incline the detent protrusion (18) is capable of sliding away and over said locking collar (14) by deflecting the spring legs (17).

9. A coupler element as defined by claim 2, in which said plastic clip (10) is made of glass-fiber reinforced plastic.

10. A coupler element as defined by claim 1, in said C-shaped portion has an opening (20) having an opening width in the annular disk (16) which is dimensioned to be smaller than the inside diameter of the annular disk.

11. A coupler element as defined by claim 10, in which said opening (20) is defined by parallel end faces (21) of the annular disk (16), which toward the outer circumference of the annular disk (16) recede behind the opening width and are rounded off there.

12. A coupler element as defined by claim 11, which said coupler element include a total of three spring legs (17) disposed offset from one another by equal circumferential angles one of said spring legs is located diametrically opposite said opening (20) of the C-shaped annular disk (16).

13. A coupler element as defined by claim 11, in which each detent protrusion (18) has an undercut face (23), extending transversely to a clip axis, and a lifting incline (24), extending at an acute angle to the clip axis, by means of which incline the detent protrusion (18) is capable of sliding away and over said locking collar (14) by deflecting the spring legs (17).

14. A coupler element as defined by claim 11, in which said plastic clip (10) is made of glass-fiber reinforced plastic.

15. A coupler element as defined by claim 10, which said coupler element include a total of three spring legs (17) disposed offset from one another by equal circumferential angles one of said spring legs is located diametrically opposite said opening (20) of the C-shaped annular disk (16).

16. A coupler element as defined by claim 10, in which each detent protrusion (18) has an undercut face (23), extending transversely to a clip axis, and a lifting incline (24), extending at an acute angle to the clip axis, by means of which incline the detent protrusion (18) is capable of sliding away and over said locking collar (14) by deflecting the spring legs (17).

17. A coupler element as defined by claim 10, in which said plastic clip (10) is made of glass-fiber reinforced plastic.

18. A coupler element as defined by claim 1, which said coupler element include a total of three spring legs (17) disposed offset from one another by equal circumferential angles one of said spring legs is located diametrically opposite said opening (20) of the C-shaped annular disk (16).

19. A coupler element as defined by claim 18, in which each detent protrusion (18) has an undercut face (23), extending transversely to a clip axis, and a lifting incline (24), extending at an acute angle to the clip axis, by means of which incline the detent protrusion (18) is capable of sliding away and over said locking collar (14) by deflecting the spring legs (17).

20. A coupler element as defined by claim 18, in which said plastic clip (10) is made of glass-fiber reinforced plastic.

21. A coupler element as defined by claim 1, in which each detent protrusion (18) has an undercut face (23), extending transversely to a clip axis, and a lifting incline (24), extending at an acute angle to the clip axis, by means of which incline the detent protrusion (18) is capable of sliding away and over said locking collar (14) by deflecting the spring legs (17).

22. A coupler element as defined by claim 21, in which said plastic clip (10) is made of glass-fiber reinforced plastic.

23. A coupler element as defined by claim 1, in which said plastic clip (10) is made of glass-fiber reinforced plastic.

* * * * *